(12) United States Patent
Mueller et al.

(10) Patent No.: US 9,751,289 B2
(45) Date of Patent: Sep. 5, 2017

(54) INSULATION ARTICLES INCLUDING CORROSION INHIBITORS AND METHODS OF PRODUCING THE SAME

(71) Applicants: Knauf Insulation, Inc., Shelbyville, IN (US); Knauf Insulation SPRL, Visé (BE)

(72) Inventors: Gert Rainer Mueller, New Palestine, IN (US); Chistopher George Hardy, Franklin, IN (US); Michael Dean Hoops, Brownsburg, IN (US); Walter Alexander Johnson, Columbus, IN (US)

(73) Assignees: Knauf Insulation, Inc., Shelbyville, IN (US); Knauf Insulation SPRL, Vise (BE)

( * ) Notice: Subject to any disclaimer, the term of this patent is extended or adjusted under 35 U.S.C. 154(b) by 346 days.

(21) Appl. No.: 14/537,179

(22) Filed: Nov. 10, 2014

(65) Prior Publication Data
US 2016/0131299 A1    May 12, 2016

(51) Int. Cl.
*B32B 17/06* (2006.01)
*B32B 27/06* (2006.01)
(Continued)

(52) U.S. Cl.
CPC .............. *B32B 37/18* (2013.01); *B32B 5/022* (2013.01); *B32B 5/26* (2013.01); *B32B 7/12* (2013.01);
(Continued)

(58) Field of Classification Search
USPC ........................... 428/74, 75, 297.4, 426, 432
See application file for complete search history.

(56) References Cited

U.S. PATENT DOCUMENTS

| | | | | |
|---|---|---|---|---|
| 4,323,620 A | * | 4/1982 | Iwabuchi | B32B 15/14 220/62.15 |
| 4,385,940 A | * | 5/1983 | Kirihara | C23C 22/40 148/261 |

(Continued)

OTHER PUBLICATIONS

Smith, Thomas L.,et al. "Steel Deck Corrosion Associated With Phenolic Insulation: Problem Causes, Prevention, Damage Assessment and Corrective Action", Proceedings of the 10th Conference on Roofing Technology, Apr. 1993, 15 pgs.

*Primary Examiner* — Lauren R Colgan
(74) *Attorney, Agent, or Firm* — Knauf Insulation, Inc.; James K. Blodgett (57) ABSTRACT

Unique insulation articles including corrosion inhibitors and methods of producing the same are disclosed. One exemplary embodiment is an article of manufacture comprising an insulation mat comprising a cured combination of a plurality of randomly oriented fibers and a binder, the insulation mat extending between a first surface and a second surface, a veil attached to the first surface, the veil structured to inhibit physical movement of the cured combination through the veil, a metal sheet attached to the second surface by a water-containing adhesive contacting the metal sheet and the second surface, and a corrosion inhibitor composition deposited on the cured combination of the insulation mat, the corrosion inhibitor composition being effective to modify toward neutral a pH of the cured combination in contact with water from the water-containing adhesive.

22 Claims, 2 Drawing Sheets

(51) Int. Cl.

| | | |
|---|---|---|
| *B32B 37/18* | (2006.01) | |
| *B32B 7/12* | (2006.01) | |
| *B32B 15/14* | (2006.01) | |
| *B32B 27/42* | (2006.01) | |
| *B32B 27/36* | (2006.01) | |
| *B32B 27/30* | (2006.01) | |
| *B32B 37/12* | (2006.01) | |
| *B32B 5/02* | (2006.01) | |
| *B32B 5/26* | (2006.01) | |
| *B32B 15/18* | (2006.01) | |
| *B32B 19/04* | (2006.01) | |
| *B32B 19/06* | (2006.01) | |
| *F16L 59/02* | (2006.01) | |
| *F16L 58/00* | (2006.01) | |
| *F16L 59/04* | (2006.01) | |

(52) U.S. Cl.
CPC .............. *B32B 15/14* (2013.01); *B32B 15/18* (2013.01); *B32B 19/041* (2013.01); *B32B 19/06* (2013.01); *B32B 27/30* (2013.01); *B32B 27/36* (2013.01); *B32B 27/42* (2013.01); *B32B 37/12* (2013.01); *B32B 2037/1276* (2013.01); *B32B 2250/03* (2013.01); *B32B 2255/02* (2013.01); *B32B 2255/20* (2013.01); *B32B 2255/24* (2013.01); *B32B 2260/021* (2013.01); *B32B 2262/0215* (2013.01); *B32B 2262/101* (2013.01); *B32B 2262/108* (2013.01); *B32B 2262/14* (2013.01); *B32B 2264/10* (2013.01); *B32B 2264/104* (2013.01); *B32B 2307/304* (2013.01); *B32B 2307/752* (2013.01); *B32B 2311/30* (2013.01); *B32B 2367/00* (2013.01); *B32B 2386/00* (2013.01); *B32B 2419/00* (2013.01); *B32B 2607/00* (2013.01); *F16L 58/00* (2013.01); *F16L 59/026* (2013.01); *F16L 59/04* (2013.01)

(56) References Cited

U.S. PATENT DOCUMENTS

| | | | | |
|---|---|---|---|---|
| 5,985,047 | A * | 11/1999 | Buxton | C23C 22/44 148/247 |
| 7,476,427 | B2 * | 1/2009 | Ruid | B32B 17/02 138/146 |
| 8,186,387 | B2 * | 5/2012 | Wadsworth | F16L 55/0336 138/143 |
| 2004/0137181 | A1 * | 7/2004 | Ruid | B32B 5/26 428/36.91 |
| 2004/0163724 | A1 * | 8/2004 | Trabbold | C03C 25/24 138/149 |
| 2005/0272338 | A1 * | 12/2005 | Shaffer | B32B 5/26 442/174 |
| 2007/0060005 | A1 * | 3/2007 | Yang | B32B 5/26 442/180 |
| 2009/0140097 | A1 * | 6/2009 | Collier | B32B 5/18 244/121 |
| 2010/0000170 | A1 * | 1/2010 | Parks | F16L 59/026 52/411 |
| 2010/0029160 | A1 * | 2/2010 | Srinivasan | C03C 25/26 442/327 |
| 2011/0086567 | A1 * | 4/2011 | Hawkins | C03C 25/1095 442/327 |
| 2012/0107547 | A1 * | 5/2012 | Fernando | B32B 5/24 428/76 |
| 2015/0362119 | A1 * | 12/2015 | Parks | B32B 5/022 138/149 |

* cited by examiner

INSULATION ARTICLES INCLUDING CORROSION INHIBITORS AND METHODS OF PRODUCING THE SAME

BACKGROUND

The present application relates generally to insulation materials or articles of manufacture including corrosion inhibitors and methods of producing the same. To form mineral wool insulation materials and articles, such as those comprising fiberglass and/or rock wool, one or more binder compositions may be combined with mineral wool fibers and the binder/fiber combination may be cured to provide an insulation mat. The inventors have discovered that the characteristics of various cured binder/fiber compositions may contribute to undesired consequences in certain applications. For example, the pH characteristics of cured binder/fiber compositions may accelerate or contribute to corrosion or hazing of metal material which come into contact with or proximity with cured binder/fiber compositions. As one non-limiting example, duct liner articles may be constructed by affixing one side of an insulation mat comprising a cured binder/fiber combination to a metal sheet and affixing a veil to an opposite side of the mat. During production the show side of the metal sheet (the side that would be visible in the ultimate application) for one duct liner article may come into contact or proximity with the veil of another duct liner article resulting in a corrosion or hazing of the show side. This effect may occur even when sheet metal with a galvanized show side is utilized. There remains a significant need for the unique insulation materials or articles of manufacture including corrosion inhibitors and methods of producing the same disclosed herein.

DISCLOSURE

For the purposes of clearly, concisely and exactly describing exemplary embodiments of the invention, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

SUMMARY

Exemplary embodiments include unique insulation articles including corrosion inhibitors and methods of producing the same. One exemplary embodiment is an article of manufacture comprising an insulation mat comprising a cured combination of a plurality of randomly oriented fibers and a binder, the insulation mat extending between a first surface and a second surface, a veil attached to the first surface, the veil structured to inhibit physical movement of the cured combination through the veil, a metal sheet attached to the second surface by a water-containing adhesive contacting the metal sheet and the second surface, and a corrosion inhibitor composition deposited on the cured combination of the insulation mat, the corrosion inhibitor composition being effective to modify toward neutral a pH of the cured combination in contact with water from the water-containing adhesive. Further embodiments, forms, objects, features, advantages, aspects, and benefits shall become apparent from the following description and drawings.

DETAILED DESCRIPTION OF ILLUSTRATIVE EMBODIMENTS

Figure 1:
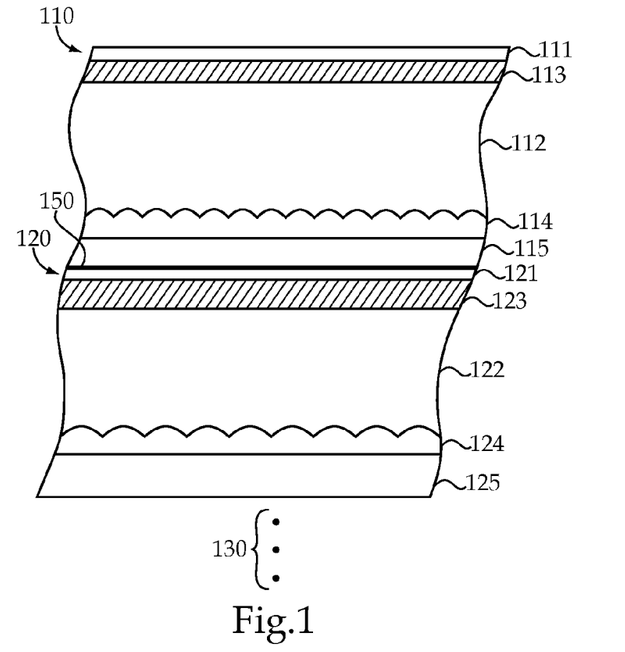
FIG. 1 is a partial side sectional view of a plurality of duct liner insulation articles according to one embodiment.

With reference to FIG. 1 there is illustrated a duct liner insulation article 110 including an insulation mat 112 comprising a cured combination of a plurality of randomly oriented fibers and a binder. A number of types of cured combinations may be utilized. The plurality of randomly oriented fibers may comprise mineral wool fibers such as fiberglass, rock wool or combinations thereof as well as other types of randomly oriented fibers. The binder may include one or more of a number of binder compounds including, for example, phenol formaldehyde (PF) binders, acrylic binders, polyester-type binders (e.g. those based on monomeric polycarboxylic acid and monomeric polyol, those based on polymeric polycarboxylic acid and monomeric polyol, those based on monomeric polycarboxylic acid and a polymeric polyol, or those based on polymeric polycarboxylic acid and a polymeric polyol), Maillard Chemistry based binders (e.g., Glucose/Ammonium Citrate, Glucose/Ammonium Sulfate, or Glucose/Ammonium Phosphates such as Glucose/Monoammonium Phosphate (MAP), Glucose/Diammonium Phosphate (DAP) or Glucose/Triammonium Phosphate (TAP)), or combinations of these and other binders.

In forming insulation mat 112 or more binder compositions is combined with a plurality of randomly oriented fibers and the binder/fiber combination is cured to bind the fibers and form the insulation mat 112. An uncured binder/fiber combination may be formed using a variety of techniques including, for example, using a spinner to form fibers from molten precursor material, admixing one or more binder compositions with the fibers, and collecting or aggregating the binder/fiber combination. The chemical reaction involved in curing the binder/fiber combination may require or may perform best under particular conditions. For example, a number of preferred binder curing chemistries require or perform best under acidic pH curing conditions, whereas a number of others require or perform best under alkaline or basic pH curing conditions. Table 1 below lists a number of non-limiting examples of binder chemistries which may be utilized in forming insulation mat 112 and the pH of each binder in an uncured state ("pH of Binder") and the pH of an aqueous extract of the cured binder.

TABLE 1

| Ex. # | Binder Chemistry | pH of Uncured Binder | pH of Aqueous Extract of Cured Binder |
|---|---|---|---|
| 1 | Phenol-Formaldehyde | Alkaline | Acidic, Neutral, or Alkaline |

TABLE 1-continued

| Ex. # | Binder Chemistry | pH of Uncured Binder | pH of Aqueous Extract of Cured Binder |
|---|---|---|---|
| 2 | Acrylic | Acidic | Acidic or Neutral |
| 3 | Maillard Reaction (Ammonium Sulfate) | Alkaline | Acidic |
| 4 | Maillard Reaction (Diammonium Phosphate) | Alkaline | Acidic |
| 5 | Polyester based on polycarboxylic acid and polyol | Acidic | Acidic, Neutral, or Alkaline |

It shall be appreciated that for some binders the pH of an aqueous extract of the binder may change significantly depending on the degree of cure is extended. Table 2A below describes the pH change for a number of different exemplary binder formulations (A-H) as a function of cure temperature (ranging from 350 F to 450 F) and cure time (ranging from 5 minutes to 30 minutes) as well as the pH at the start of cure, the pH at the end of cure and the solubility characteristics of the binder at various degrees of curing. Table 2B below provides details as to the formulation of binders A-H.

TABLE 2A

| | | Degree of Binder Cure (Temperature/Time) | | | | | | |
|---|---|---|---|---|---|---|---|---|
| Binder | Binder pH | 350 F./ 5 m | 400 F./ 5 m | 400 F./ 10 m | 400 F./ 20 m | 400 F./ 30 m | 450 F./ 30 m | Start pH | End pH |
| A | 9.68 | 6.75# | 5.15# | 1.74* | 1.68* | 2.20* | 2.33* | Basic | Acidic |
| B | 6.95 | 6.55# | 6.22# | 2.29** | 2.40* | 3.30* | 3.15* | Basic | Acidic |
| C | 9.40 | 6.36# | 5.85# | 6.80* | 9.11* | 9.00* | 9.59* | Basic | Neutral-Basic |
| D | 7.80 | 8.16# | 7.90# | 8.05** | 9.47* | 10.03* | 9.88* | Basic | Basic |
| E | 4.00 | 4.05# | 4.02# | 4.05# | 2.53* | 5.95* | 6.93* | Acidic | Neutral |
| F | 4.75 | 4.70# | 4.70# | 4.75# | 6.12* | 6.65* | 7.08* | Acidic | Neutral |
| G | 1.65 | 2.05# | 2.02# | 2.15# | 2.55* | 3.80* | 6.12* | Acidic | Acidic-Neutral |
| H | 4.00 | 4.02# | 4.02# | 4.15# | 7.50* | 8.50* | 8.42* | Acidic | Basic |

= binder water soluble
*= binder water insoluble
**= binder partially water soluble

TABLE 2B

| Binder | Constituents ** | Solids | Ratio | Amount (g) |
|---|---|---|---|---|
| A | Water | | | 115.63 |
| | Dextrose | 90.9% | 80.34 | 82.44 |
| | AS | 40.0% | 16.82 | 39.22 |
| | NH3 | 19.0% | 2.52 | 12.37 |
| B | Water | | | 148.01 |
| | Dextrose | 90.9% | 76.4 | 95.3 |
| | DAP | 100.0% | 5.57 | 6.32 |
| C | Water | | | 46.07 |
| | PF-Urea | 47.1% | 100 | 186.09 |
| | AS | 40.0% | 4.5 | 9.86 |
| | NH3 | 19.0% | 1.68 | 7.75 |
| D | Water | | | 79.1 |
| | SMA | 49.0% | 324.97 | 152.18 |
| | TEA | 100.0% | 81.57 | 18.72 |
| E | Water | | | 81.87 |
| | PAA | 48.0% | 100 | 143.94 |
| | Glycerol | 100.0% | 35 | 24.18 |
| F | Water | | | 81.87 |
| | PAA | 48.0% | 100 | 143.94 |
| | TEA | 100.0% | 35 | 24.18 |
| G | Water | | | 156.72 |
| | CA | 100.0% | 100 | 46.64 |
| | Glycerol | 100.0% | 100 | 46.64 |
| H | Water | | | 156.72 |
| | CA | 100.0% | 100 | 46.64 |
| | TEA | 100.0% | 100 | 46.64 |

** all binder formulations prepared as 37.31% binder solids
AS = Ammonium Sulfate
NH3 = Ammonia
DAP = Diammonium Phosphate
PF-Urea = Phenol-Formaldehyde (PF) Resin pre-reacted with Urea in a 70/30 blend
AS = Ammonium Sulfate
NH3 = Ammonia
SMA = Styrene Maleic Anhydride binder
TEA = Triethanolamine
PAA = Rohm & Haas Acumer 1000
PAA = Rohm & Haas Acumer 1000
TEA = Triethanolamine
CA = Citric Acid
CA = Citric Acid
TEA = Triethanolamine The required or preferred curing pH conditions for various binders result in cured binder/fiber compositions having particular characteristics. A number of cured binder/fiber combinations have an acidic pH including, such as the examples listed in Tables 1, 2A and 2B above. A number of other cured binder/fiber combinations may have an alkaline pH including, such as the examples listed in Tables 1, 2A and 2B above. It shall be appreciated that the pH of a cured binder/fiber combination may be characterized by a number of techniques including performing a pH measurement (e.g. with a pH meter or pH chemical test strip) of a resulting aqueous solution when the cured binder/fiber combination is immersed in deionized water.

In the embodiment illustrated in FIG. 1, a corrosion inhibitor 113 is deposited and on a first side of insulation mat 112 after the binder/fiber combination has been cured. This avoids interference by the corrosion inhibitor 113 with the curing reaction of the binder/fiber composition. Corrosion inhibitor 113 may be applied to the cured binder/fiber combination using a number of techniques including, for example, as an aqueous spray, as a liquid, as a slurry, or as a powder. It shall be appreciated that the application technique may be selected based upon considerations such as the solubility characteristics of a particular corrosion inhibitor and the particular application devices and equipment which are preferred for a given production process.

The chemical composition of corrosion inhibitor 113 is preferably selected to provide at least one of a pH neutralization effect relative to the characteristics of the cured binder/fiber combination of insulation mat 112, a passivation effect relative to a metal surface which may come into contact or proximity with the duct liner insulation article 110, or a combination of both effects. Accordingly, corrosion inhibitor 113 may comprise a number of different chemical compositions depending on the characteristics of the cured binder/fiber combination of insulation mat 112. For cured binder/fiber combinations having an acidic pH, one or more chemical compound providing an alkaline pH may be selected as the corrosion inhibitor 113. Table 3 below lists a number of preferred alkaline corrosion inhibitors and their water solubility characteristics.

TABLE 3

| Ex. # | Alkaline Corrosion Inhibitor | Solubility Characteristic |
|---|---|---|
| 1. | sodium hydroxide | water soluble |
| 2. | sodium carbonate | water soluble |
| 3. | sodium bicarbonate | water soluble |
| 4. | potassium hydroxide | water soluble |
| 5. | potassium carbonate | water soluble |
| 6. | potassium bicarbonate | water soluble |
| 7. | ammonium carbonate. | water soluble |
| 8. | ammonium bicarbonate | water soluble |
| 9. | monoethanolamine | water soluble |
| 10. | diethanolamine | water soluble |
| 11. | triethanolamine | water soluble |
| 12. | zinc phosphate | essentially water insoluble |
| 13. | calcium phosphate | essentially water insoluble |
| 14. | long chain alkyl imidazoline (e.g. those offered commercially by Lonza under the registered trademarks UNAMINE ® O and UNAMINE ® C) | essentially water insoluble |

In forms where a corrosion inhibitor with an alkaline pH is selected, the corrosion inhibitor 113 may comprise one or more of the alkaline corrosion inhibitors listed in Table 3 above as well as combinations thereof. In further forms where a corrosion inhibitor with an alkaline pH is selected, the corrosion inhibitor 113 may consist essentially of any of the alkaline corrosion inhibitors listed in Table 3 above or may consist essentially of a combination of two or more of the alkaline corrosion inhibitors listed in Table 3 above. It shall be further appreciated that other alkaline corrosion inhibitors may also be utilized in addition to or instead of the non-limiting examples disclosed herein.

For cured binder/fiber combinations having an alkaline pH, one or more chemical compound providing an acidic pH may be selected as the corrosion inhibitor 113. Table 4 below lists a number of preferred acidic corrosion inhibitors.

TABLE 4

| Ex. # | Acidic Corrosion Inhibitor |
|---|---|
| 1. | Tetraaquahydrogen |
| 2. | Sodium Bicarbonate |
| 3. | Potassium Bicarbonate |
| 4. | Magnesium Bicarbonate |
| 5. | Calcium Bicarbonate |
| 6. | Ammonium Bicarbonate |

In forms where a corrosion inhibitor with an acidic pH is selected, the corrosion inhibitor 113 may comprise one or more of the acidic corrosion inhibitors listed in Table 4 above as well as combinations thereof. In further forms where a corrosion inhibitor with an acidic pH is selected, the corrosion inhibitor 113 may consist essentially of any of the acidic corrosion inhibitors listed in Table 4 above or may consist essentially of a combination of two or more of the acidic corrosion inhibitors listed in Table 4 above. It shall be further appreciated that other acidic corrosion inhibitors may also be utilized in addition to or instead of the non-limiting examples disclosed herein.

It shall be appreciated that the physical location and extent of the corrosion inhibitor 113 is shown generally in FIG. 1 for purposes of illustration and that a number of particular locations and extents are contemplated. In certain forms the corrosion inhibitor 113 may be deposited and positioned substantially entirely on the surface of the first side of insulation mat 112. In certain forms the corrosion inhibitor 113 may be deposited on the surface of the first side of insulation mat 112 and may also extend into the insulation mat 112. The degree to which the corrosion inhibitor 113 extends into the insulation mat 112 may vary depending upon the form in which the corrosion inhibitor is applied (e.g., powder form, liquid, aqueous solution, slurry), amount of corrosion inhibitor applied, and the application technique utilized to apply the corrosion inhibitor. For certain preferred spray on applications inhibitors in the 0.1 to 2 g/ft$^2$ of active ingredient have been found effective. Exemplary corrosion inhibitors which are effective in this range include Sodium Carbonate ($Na_2CO_3$), Potassium Hydroxide (KOH), Triethanolamine (TEA), 2-Nitrophenol, Sodium Molybdate ($Na_2MoO_4$) and Cerium Chloride ($CeCl_3$).

As further illustrated in FIG. 1, a veil 111 is affixed to the first side of insulation mat 112. Veil 111 is preferably structured to inhibit physical movement of the cured binder/fiber combination past veil 111 while allowing the passage of vapor or liquid. It shall be appreciated that veil 111 may not entirely prevent physical movement of the cured binder/fiber composition and may permit the passage of some amount of the cured binder/fiber composition (e.g., a small amount of loose fiber) through veil 111. In certain preferred forms veil 111 may comprise a fiberglass veil, or blends of glass and thermoplastic elastomeric (TPE) fibers such as veils comprising combinations or blends of fiberglass and polyester. Veil 111 may be affixed to the first side of insulation mat using an adhesive. A water based adhesive is preferred although a hot melt adhesive or a non-water based adhesive may also be utilized. A variety of water based adhesives may be utilized. It shall be appreciated that the water based adhesive is preferably selected to have a pH which is either neutral or which corresponds to the pH of the selected corrosion inhibitor. Thus, acidic to neutral pH adhesives are preferred for use in combination with acidic corrosion inhibitors, and alkaline to neutral pH adhesives are preferred for use in combination with alkaline corrosion inhibitors.

The second side of insulation mat 112 is affixed to metal sheet 115 by adhesive 114 which may be a water containing adhesive such as the VAE laminating adhesive 82000 adhesive offered commercially by EFI Polymers. Other suitable adhesives types include, without limitation, water-born adhesives, latex emulsions, e.g. Polyvinyl acetate (PVA) emulsions, polyacrylate emulsions, Ethylene Vinyl acetate (EVA) emulsion, and Styrene-Butadiene emulsions. Metal sheet 115 may be a steel sheet, a stainless steel sheet, or a galvanized steel sheet. It shall be appreciated that the physical location and extent of the adhesive is shown generally in FIG. 1 and that a number of particular locations and extents are contemplated. In one non limiting example, 82000 adhesive was applied at a rate of 60 g/ft$^2$ to a galvanized steel sheet to affixed an one inch thickness insulation mat comprising a cured combination of fiberglass and a dextrose diammonium phosphate (DAP) binder with an all-glass veil affixed to the insulation mat.

FIG. 1 further illustrates duct liner insulation article 120 which includes insulation mat 122, corrosion inhibitor 123, veil 121, adhesive 124 and metal sheet 125. The characteristics and properties of these components of duct liner insulation article 120 may be substantially the same as insulation mat 112, corrosion inhibitor 113, veil 111, adhesive 114 and metal sheet 115 of duct liner insulation article 110 as described above.

Duct liner insulation articles 110 and 120 of the various compositions and combinations described herein above may be produced according to a process including the following operations: (a) forming an insulation mat comprising an uncured of binder/fiber combination, (b) curing the insulation mat to provide a cured binder/fiber combination, (c) applying a corrosion inhibitor composition to a first side of the cured insulation mat, (d) affixing a veil to the first side of the insulation mat with a first adhesive, (e) affixing the second side of the insulation mat to a metal sheet with a second adhesive, (f) repeating process operations (a) through (e) to provide a plurality of articles, (g) positioning the resulting articles in contact or proximity with one another, (h) allowing the second adhesive to set for a predetermined period of time, and (i) further forming duct structures using one or more articles.

The configuration illustrated in FIG. 1 depicts portions of a plurality of duct liner insulation articles including article 110 and article 120 which are positioned in a stack with veil 121 contacting a show side of metal sheet 115 at interface 150. As indicated by ellipsis 130 additional duct liner insulation articles may also be provided in the stack. It shall be further appreciated that the stacked position of article 110 and article 120 is one non-limiting example of a configuration in which a portion of one duct liner insulation article may be in contact with or proximity with a portion of another duct liner insulation article. In other configurations, adjacent articles may be spaced apart or may be in contact with one another over certain regions and spaced apart in other regions. The illustrated configuration is but one example of a configuration presenting potential for undesired consequences such as hazing, corrosion, or other chemical reactions affecting the show side of a duct liner insulation article.

Without wishing to be limited to particular mechanisms of action or efficacy, the theory underlying certain exemplary mechanisms shall now be-described. The structure and composition of articles 110 and 120 are believed to mitigate the potential for undesired consequences such as hazing, corrosion, or other chemical reactions affecting the show side of a duct liner insulation article by a pH neutralization effect relative to the characteristics of the cured binder/fiber combination of insulation mat 112, a passivation effect relative to the show side of metal sheet 115, or a combination of both effects. After articles 110 and 120 are initially assembled, adhesives 113 and 123 transition from a wet or unfixed state to a dried or fixed state over a period of time. Moisture from adhesive 113 and 123 may travel through insulation mats 112 and 122, respectively. As this moisture interacts with the cured binder/fiber combination an acidic or alkaline pH may be imparted to the moisture. The pH neutralization effect of corrosion inhibitors 113 and 123 is believed to modify the pH of the moisture in contact with the cured binder/fiber combination toward neutral by providing an opposing pH providing a neutralizing reaction. The passivation effect of corrosion inhibitors 113 and 123 is believed to involve movement of the corrosion inhibitor through the insulation mats 112 and 122 and veils 111 and 121 to contact an adjacent metal surface where the corrosion inhibitor passivates the metal surface by chemically interacting with binding sites that might otherwise be reactive to the pH of the cured binder/fiber composition.

In certain embodiments including galvanized metal sheets a particular mechanism of action is believed to occur. It believed that in such embodiments an initially shiny metal surface of the zinc metal reacts with the moisture to form hydrated zinc oxides. The surface areas in contact with moisture become dull and also form white haze. The appearance of the surface is non-uniform and is objectionable, especially in those cases where the affected surface is an exposed surface or show side in construction applications. Mitigating these issues is not simple or straightforward. One complication is that the presence of acidic or alkaline compounds, such as the disclosed corrosion inhibitors, may themselves provide undesired corrosion or reactions producing similar results. Another complication is that the corrosion inhibitors themselves may produce objectionable results, for example, providing a non-uniform or blemished surface when applied directly to a metal surface or directly onto the surface of an adjacent article that comes in contact of the galvanized steel. In those instances the applied corrosion inhibitors typically form a film or crust on the galvanized steel surface which is undesirable. In these embodiments a surprising result occurred by application of the corrosion inhibitor as illustrated in FIG. 1. While the corrosion inhibitor was free to pass through the veil and in theory produce the pH neutralization and/or passivation effect as well as the undesired results noted above, it was observed in practice that the beneficial effects were present whereas the undesired effects and complications were not.

Figure 2:
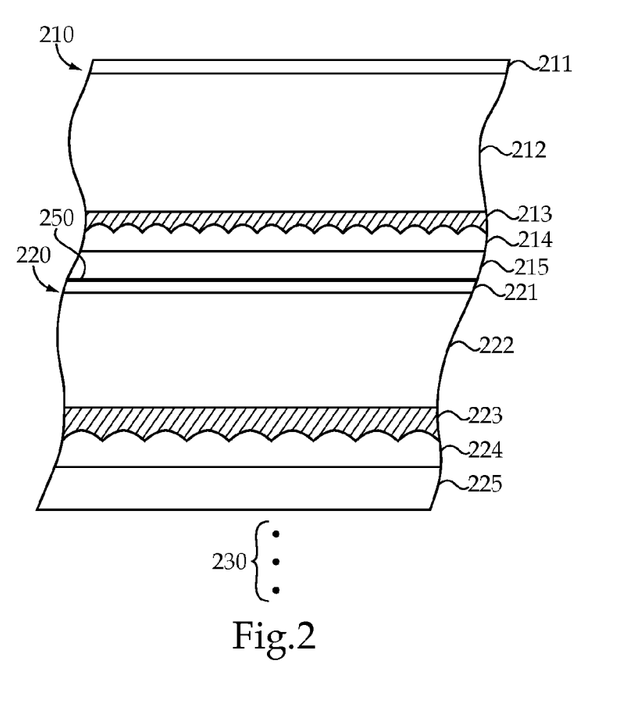
FIG. 2 is a partial side sectional view of a plurality of duct liner insulation articles according to another embodiment.

With reference to FIG. 2 there is illustrated another embodiment comprising a plurality of duct liner insulation articles including duct liner insulation articles 210 and 220. It is contemplated that additional duct liner insulation articles may also be included as indicated by ellipsis 230. Articles 210 and 220 include a number components which may have the same or similar characteristics and properties as corresponding components illustrated and described above in connection with FIG. 1. In FIG. 2 corresponding components are labeled with references numerals incremented by 100 relative to those of FIG. 1. Thus, insulation mat 212, corrosion inhibitor 213, veil 211, adhesive 214 and metal sheet 215 of article 210 correspond to insulation mat 112, corrosion inhibitor 113, veil 111, adhesive 114 and metal sheet 115 of article 110, respectively. Similarly, insulation mat 222, corrosion inhibitor 223, veil 221, adhesive 224 and metal sheet 225 of article 220 correspond to insulation mat 122, corrosion inhibitor 123, veil 121, adhesive 124 and metal sheet 125 of article 120, respectively. Likewise, ellipsis 230 corresponds to ellipsis 130, and interface 250 corresponds to interface 150. The different forms, compositions, variations and alternative described in connection with the embodiment of FIG. 1 also apply to the embodiment of FIG. 2.

It shall be appreciated that the embodiment of FIG. 2 differs from the embodiment of FIG. 1 in certain respects which shall now be described. In the embodiment illustrated in FIG. 2, corrosion inhibitor 213 is deposited on the bottom side of insulation mat 212 which faces adhesive 214 and metal sheet 215. This configuration permits veil 211 to be affixed to the top side of insulation mat 212 using additional techniques. In one non-limiting example, insulation mat 212 may initially comprise an uncured binder/fiber combination, veil 211 may be placed on the upper side of insulation mat 212 in the uncured state, and the insulation mat 212 and veil 211 may be cured in this configuration effective to affix veil 211 to insulation mat 212. After curing, corrosion inhibitor 213 may be applied to the bottom side of insulation mat 212 using any of the techniques disclosed above in connection with FIG. 1. The bottom side of insulation mat 212 may then be affixed to metal sheet 215 with adhesive 214. In certain preferred forms the amount of corrosion inhibitor applied to the bottom side of insulation mat 212 and/or the degree of penetration into insulation mat 212 may be the same as or may be increased relative to the embodiment illustrated in FIG. 1.

Duct liner insulation articles 210 and 220 of the various compositions and combinations described herein above may be produced according to a process including the following operations: (a) forming an insulation mat comprising an uncured of binder/fiber combination, (b) applying a veil to the first side of the insulation mat, (c) curing the insulation mat in contact with the veil to provide a cured binder/fiber combination affixed to the veil, (d) applying a corrosion inhibitor composition to the second side of the cured insulation mat, (e) affixing the second side of the insulation mat to a metal sheet with an adhesive, (f) repeating process operations (a) through (e) to provide a plurality of articles, (g) positioning the resulting articles in contact with or proximity with one another, (h) allowing the adhesive to set for a predetermined period of time, and (i) further forming duct structures using one or more articles.

It shall be appreciated that alternate techniques and order of operations for applying the veil may be utilized including, for example, those described above in connection with FIG. 1. It shall be further appreciated that the structure and composition of articles 210 and 220 are believed to mitigate the potential for undesired consequences such as hazing, corrosion, or other chemical reactions affecting the show side of a duct liner insulation article by a pH neutralization effect relative to the characteristics of the cured binder/fiber combination of the insulation mats and a passivation effect relative to the show side of adjacent metal sheet, or a combination of both effects. These effects may have the characteristics described above in connection with FIG. 1.

Figure 3:
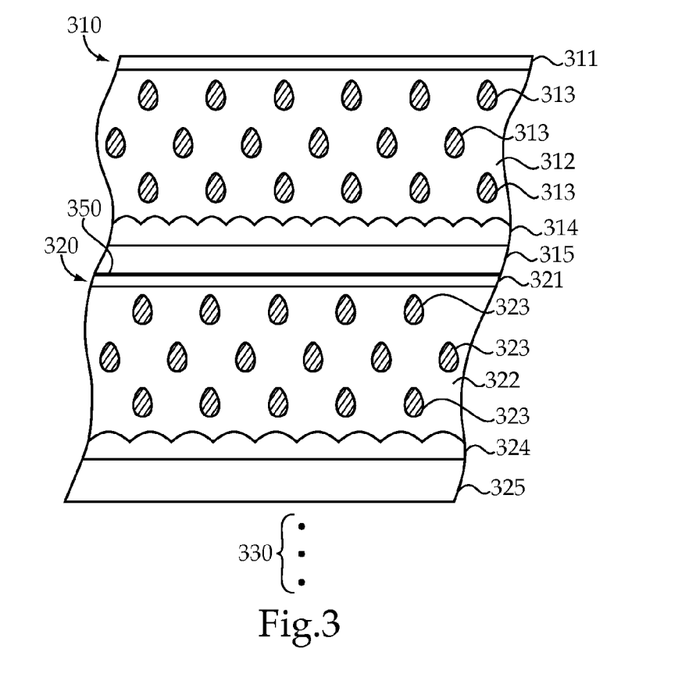
FIG. 3 is a partial side sectional view of a plurality of duct liner insulation articles according to another embodiment.

With reference to FIG. 3 there is illustrated another embodiment comprising a plurality of duct liner insulation articles including duct liner insulation articles 310 and 320. It is contemplated that additional duct liner insulation articles may also be included as indicated by ellipsis 330. Articles 310 and 320 include a number components which may have the same or similar characteristics and properties as corresponding components illustrated and described above in connection with FIG. 1. In FIG. 3 corresponding components are labeled with references numerals incremented by 200 relative to those of FIG. 1. Thus, insulation mat 312, corrosion inhibitor 313, veil 311, adhesive 314 and metal sheet 315 of article 310 correspond to insulation mat 112, corrosion inhibitor 113, veil 111, adhesive 114 and metal sheet 115 of article 110, respectively. Similarly, insulation mat 322, corrosion inhibitor 323, veil 321, adhesive 324 and metal sheet 325 of article 320 correspond to insulation mat 122, corrosion inhibitor 123, veil 121, adhesive 124 and metal sheet 125 of article 120, respectively. Likewise, ellipsis 330 corresponds to ellipsis 130, and interface 350 corresponds to interface 150. The different forms, compositions, variations and alternative described in connection with the embodiment of FIG. 1 also apply to the embodiment of FIG. 3.

It shall be appreciated that the embodiment of FIG. 3 differs from the embodiment of FIG. 1 in certain respects which shall now be described. In the embodiment illustrated in FIG. 3, corrosion inhibitor 313 is deposited at a plurality of locations within the thickness of cured insulation mat 312. This configuration permits veil 311 to be affixed to the top side of insulation mat 312 using any of the techniques described above in connection with FIGS. 1 and 2. Corrosion inhibitor 313 may be applied to the plurality of locations within insulation mat 312 using a number of techniques. Exemplary techniques include apparatuses including injection or application needles or nozzles which penetrate into the thickness of insulation mat 312 to various predetermined depths and jet spray injectors which direct a stream of corrosion inhibitor that penetrates into the thickness of the insulation mat. These application techniques may penetrate into either side of insulation mat 312. The corrosion inhibitor 313 may be applied prior to or after veil 311 is affixed to the insulation mat 312. Likewise, the corrosion inhibitor 313 may be applied prior to or after the insulation mat 312 is affixed to metal sheet 315. The bottom side of insulation mat 312 may be affixed to metal sheet 315 with adhesive 314.

Duct liner insulation articles 310 and 320 of the various compositions and combinations described herein above may be produced according to a process including the following operations: (a) forming an insulation mat comprising an uncured of binder/fiber combination, (b) applying a veil to the first side of the insulation mat, (c) curing the insulation mat in contact with the veil to provide a cured binder/fiber combination affixed to the veil, (d) applying a corrosion inhibitor composition at interior locations in the insulation mat using techniques such as penetrating injection needles, penetrating injection nozzles, or penetrating sprays, (e) affixing the second side of the insulation mat to a metal sheet with an adhesive, (f) repeating process operations (a) through (e) to provide a plurality of articles, (g) positioning the resulting articles in contact with or proximity with one another, (h) allowing the adhesive to set for a predetermined period of time, and (i) further forming duct structures using one or more articles.

It shall be appreciated that alternate techniques and order of operations for applying the veil may be utilized including, for example, those described above in connection with FIG. 1. In another variation, operation (e) may be performed prior to operation (d). It shall be further appreciated that the structure and composition of articles 310 and 320 are believed to mitigate the potential for undesired consequences such as hazing, corrosion, or other chemical reactions affecting the show side of a duct liner insulation article by a pH neutralization effect relative to the characteristics of the cured binder/fiber combination of the insulation mats and a passivation effect relative to the show side of adjacent metal sheet, or a combination of both effects. These effects may have the characteristics described above in connection with FIG. 1.

Figure 4:
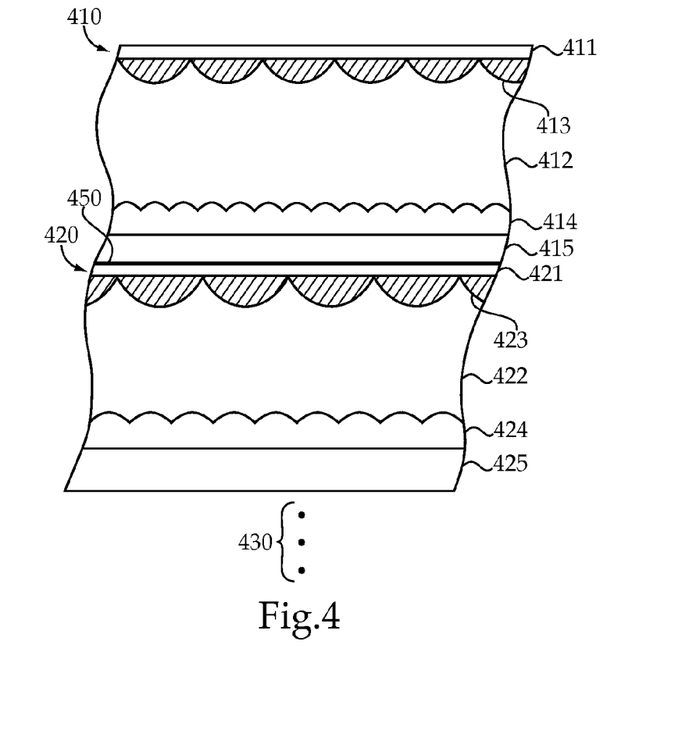
FIG. 4 is a partial side sectional view of a plurality of duct liner insulation articles according to another embodiment.

With reference to FIG. 4 there is illustrated another embodiment comprising a plurality of duct liner insulation articles including duct liner insulation articles 410 and 420. It is contemplated that additional duct liner insulation articles may also be included as indicated by ellipsis 430. Articles 410 and 420 include a number components which may have the same or similar characteristics and properties as corresponding components illustrated and described above in connection with FIG. 1. In FIG. 4 corresponding components are labeled with references numerals incremented by 300 relative to those of FIG. 1. Thus, insulation mat 412, corrosion inhibitor 413, veil 411, adhesive 414 and metal sheet 415 of article 410 correspond to insulation mat 112, corrosion inhibitor 113, veil 111, adhesive 114 and metal sheet 115 of article 110, respectively. Similarly, insulation mat 422, corrosion inhibitor 423, veil 421, adhesive 424 and metal sheet 425 of article 420 correspond to insulation mat 122, corrosion inhibitor 123, veil 121, adhesive 124 and metal sheet 125 of article 120, respectively. Likewise, ellipsis 430 corresponds to ellipsis 130, and interface 450 corresponds to interface 150. The different forms, compositions, variations and alternative described in connection with the embodiment of FIG. 1 also apply to the embodiment of FIG. 4.

It shall be appreciated that the embodiment of FIG. 4 differs from the embodiment of FIG. 1 in certain respects which are similar to the differences described above in connection with FIG. 3. In the embodiment of FIG. 4 the corrosion inhibitor 413 may be deposited using techniques similar to those described above in connection with FIG. 3. The position of corrosion inhibitor 413 differs in that it is controlled to be at locations within insulation mat 412 that are proximate veil 411. This may be accomplished by varying the depth or penetration of the application needle or nozzle or the intensity of the penetrating jet spray. The production processes described above in connection with FIG. 3 may also be utilized for production of the articles illustrated in the embodiment of FIG. 4.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. An article of manufacture comprising:
   an insulation mat comprising a cured combination of a plurality of randomly oriented fibers and a binder, the insulation mat extending between a first surface and a second surface;
   a veil attached to the first surface, the veil structured to inhibit physical movement of the cured combination through the veil;
   a metal sheet attached to the second surface by a water-containing adhesive contacting the metal sheet and the second surface; and
   a corrosion inhibitor composition deposited on the cured combination of the insulation mat, the corrosion inhibitor composition being effective to modify toward neutral a pH of the cured combination in contact with water from the water-containing adhesive.

2. The article of manufacture of claim 1 wherein the cured combination has an acidic pH and the corrosion inhibitor composition has an alkaline pH.

3. The article of manufacture of claim 2 wherein the corrosion inhibitor composition comprises a water soluble compound.

4. The article of manufacture of claim 3 wherein the water soluble compound comprises at least one of sodium hydroxide, sodium carbonate, sodium bicarbonate, potassium hydroxide, potassium carbonate, potassium bicarbonate, ammonium carbonate, ammonium bicarbonate, monoethanolamine, diethanolamine, and triethanolamine.

5. The article of manufacture of claim 2 wherein the corrosion inhibitor composition comprises an essentially water insoluble compound.

6. The article of manufacture of claim 5 wherein the essentially water insoluble compound comprises at least one of zinc phosphate, calcium phosphate, and a long chain alkyl imidazoline.

7. The article of manufacture of claim 1 wherein the corrosion inhibitor composition is deposited on the first surface of the insulation mat.

8. The article of manufacture of claim 1 wherein the binder is a non-phenol formaldehyde (PF) composition.

9. The article of manufacture of claim 1 wherein the binder comprises one of an acrylic binder, a polyester binder, a binder which includes at least one reaction product from a Maillard reaction, and a combination thereof.

10. The article of manufacture of claim 1 wherein the binder comprises a polyester-type binder based upon one of:
   a monomeric polycarboxylic acid and a monomeric polyol,
   a polymeric polycarboxylic acid and a monomeric polyol,
   a monomeric polycarboxylic acid and a polymeric polyol, and
   a polymeric polycarboxylic acid and a polymeric polyol.

11. The article of manufacture of claim 1 wherein the binder comprises at least one reaction product from a Maillard reaction.

12. The article of manufacture of claim 11 wherein the reaction product comprises at least one product of a reducing sugar and an amine reactant.

13. The article of manufacture of claim 11 wherein the reaction product comprises at least one product of a carbohydrate reactant and a polycarboxylic acid ammonium salt reactant.

14. The article of manufacture of claim 1 wherein the metal sheet is a galvanized metal sheet.

15. The article of manufacture of claim 1 wherein the plurality of randomly oriented fibers are one of fiberglass fibers and rock wool fibers.

16. An article of manufacture comprising:
   an insulation mat comprising a cured combination of a plurality of randomly oriented fibers and a binder, the insulation mat extending between a first surface and a second surface, the cured combination having one of an acidic pH and an alkaline pH when immersed in deionized water;
   a veil attached to the first surface, the veil structured to inhibit physical movement of the cured combination through the veil; and
   a corrosion inhibitor composition deposited on the cured combination of the insulation mat, the corrosion inhibitor composition having the opposite of the one of the acidic pH and the alkaline pH of the cured composition when immersed in deionized water.

17. The article of manufacture of claim 16 further comprising a metal sheet attached to the second surface by a water-containing adhesive contacting the metal sheet and the second surface.

18. The article of manufacture of claim 17 wherein the corrosion inhibitor composition is effective to modify toward neutral a pH of the cured combination in contact with water from the water-containing adhesive.

19. The article of manufacture of claim 17 wherein the veil is positioned in contact with a surface of a second metal sheet.

20. The article of manufacture of claim 19 wherein the corrosion inhibitor composition provides passivation of the surface of the second metal sheet.

21. The article of manufacture of claim 20 wherein the surface of the second metal sheet is galvanized.

22. The article of manufacture of claim 16 wherein the binder comprises at least one reaction product from a Maillard reaction, the cured composition has an acidic pH, and the corrosion inhibitor composition has an alkaline pH.

* * * * *